United States Patent [19]
Van Dort et al.

[11] Patent Number: 5,227,069
[45] Date of Patent: Jul. 13, 1993

[54] BIOREMEDIATION METHOD

[75] Inventors: Heide M. Van Dort, West Lafayette, Ind.; Donna L. Bedard, Loudonville, N.Y.

[73] Assignee: General Electric Company, Schenectady, N.Y.

[21] Appl. No.: 851,708

[22] Filed: Mar. 16, 1992

[51] Int. Cl.$^5$ .............................. C02F 3/28
[52] U.S. Cl. ..................... 210/610; 210/612; 210/614; 210/747; 210/909; 435/262; 435/264
[58] Field of Search ............... 210/610, 611, 901, 909, 210/747, 601, 612, 614; 435/262, 264; 405/128, 129

[56] References Cited

U.S. PATENT DOCUMENTS

| | | | |
|---|---|---|---|
| 3,779,866 | 12/1973 | Azarowicz | 435/262 |
| 4,464,805 | 5/1987 | Focht | 210/909 |
| 4,477,570 | 10/1989 | Colaruotolo et al. | 435/262 |
| 4,493,895 | 1/1985 | Colaruotolo et al. | 435/262 |
| 4,584,102 | 4/1986 | Bogart et al. | 210/610 |
| 4,755,296 | 7/1988 | Ying et al. | 210/909 |
| 4,816,403 | 3/1989 | Roy | 210/909 |
| 4,925,802 | 5/1990 | Nelson et al. | 435/264 |
| 4,948,297 | 8/1990 | Fleming | 210/901 |

OTHER PUBLICATIONS

Yagi et al., "Degradation of Polychlorinated Biphenyls by Microorganisms" Journal WPCF, vol. 52, No. 5, May 1980, pp. 1035–1043.
Article—Reductive Dehalogenations of Halobenzoates by Anaerobic Lake Sediment Microorganisms, Amikam Horowitz et al.—Applied and Environmental Microbiology, May 1983, vol. 45, No. 5—pp. 1459–1465.

Primary Examiner—Stanley S. Silverman
Assistant Examiner—Christopher Upton
Attorney, Agent, or Firm—William A. Teoli; William H. Pittman

[57] ABSTRACT

A method is provided for bioremediating aged PCBs such as Aroclor 1260 in aquatic sediments under anerobic conditions by stimulating the dechlorination of the aged PCBs through addition of brominated or iodinated biphenyls or through the addition of a microbial inoculum from another location in addition to brominated or iodinated biphenyls.

14 Claims, 5 Drawing Sheets

BIOREMEDIATION METHOD

BACKGROUND OF THE INVENTION

The present invention relates to a method for bioremediating sediments contaminated with PCBs. More particularly, the present invention relates to the use of brominated or iodinated biphenyls under anaerobic conditions to stimulate extensive and rapid microbial dechlorination of PCBs in freshwater, estuarine and marine sediments.

METHOD FOR BIODEGRADING PCBS

Prior to the present invention, various techniques were developed for eliminating PCBs, or polychlorinated biphenyls, from the environment. In instances where the PCBs are dissolved in an organic solvent, such as transformer oil, the contaminated solution can be treated with a mixture of polyethylene glycol and alkali metal hydroxide as shown by Brunelle, U.S. Pat. No. 4,351,718, assigned to the same assignee as the present invention and incorporated herein by reference. In many cases, the PCBs are located in more exposed environmental areas, such as landfill sites, river beds and sewage sludge. Direct chemical treatment of PCBs in such contaminated sites is often not feasible since the resulting treated solids are difficult to process further and recycle.

As shown by Colaruotolo et al., U.S. Pat. No. 4,447,570, an alternate procedure can be used for treating halogenated organic waste by effecting the removal of halogenated aromatics from the contaminated organic waste by microbial degradation. As taught by Colaruotolo et al., microorganisms have been identified having the capability of efficiently utilizing various aromatic organic chemicals as carbon sources for growth. In addition, microorganisms also have been isolated from the environment that are capable of growing in the presence of chlorinated aromatic compounds. Experience has shown, however, that PCBs found in weathered environmental soil samples often contain five or more chemically combined chlorine atoms per molecule, indicating that such polychlorinated biphenyls generally resist biodegradation.

It has been further found that not only does the total number of chemically combined chlorine atoms per biphenyl nucleus influence the manner by which PCBs resist biodegradation, but the location of chlorine atom substitution on the biphenyl nucleus is also an important factor. For example, the positions at which chlorine may be attached to a biphenyl nucleus are shown below:

Reductive dechlorination of PCBs is the stepwise removal of chlorines from the biphenyl nucleus. The chlorine atoms that are removed are replaced with hydrogen atoms. Biological dechlorination of PCBs in contaminated environmental sites has practical value for cost effective clean-up procedures with minimal ecological damage. Environmetnal dechlorination of PCBs via losses of meta and para chlorines has been reported for freshwater, estuarine and marine sediments. This dechlorination has been attributed to anaerobic bacteria that reside in the sediments. However, prior to the present invention there has been no acceptable way to stimulate or accelerate the microbial dechlorination of PCBs that have accumulated in sediments.

The microbial population that resides in anaerobic sediments is very diverse, and most likely the microorganisms that are capable of dechlorinating PCBs make up only a small fraction of the population. All of the microorganisms must compete for the limited nutrients that are available, and in general only those that have some kind of competitive advantage are actively growing. A competitive advantage can come from an ability to use a nutrient more efficiently than any of the other microorganisms, or it can come from an ability to use for food or energy some compound that no other micoorganisms in the population can use.

It has been proposed that those anaerobic microorganisms that can dechlorinate PCBs actually derive energy by removing the chlorines from PCBs and replacing them with hydrogens. If this hypothesis is correct, then a microbial population that is capable of dechlorinating PCBs should derive a benefit from the process of dehalogenation that will give it a growth advantage over other populations that do not have this ability. Furthermore, it should be possible to selectively favor or "enrich" microbial populations responsible for dehalogenation of PCBs by providing favorable substrates for dehalogenation.

Certain PCBs, for example Aroclor 1260, a mixture of polychlorinated biphenyls comprised of mainly hexa- and heptachlorobiphenyls, are difficult substrates for microbial attack. In many environmental sites only slight dechlorination of the PCBs has occurred naturally. However, as reported by Bedard et al, in the Ninth Progress Report (1990) of the General Electric Company Research and Development Program, for the destruction of PCBs, individual PCB congeners, such as 2,3,4,5,6-pentachlorobiphenyl, have been found to be capable of stimulating dechlorination of Aroclor 1260 in sediment by indigenous anaerobic microorganisms. Unfortunately, the addition of PCB congeners to a contaminated site is not an acceptable means of bioremediation because PCBs are regulated and in most instances the PCB congener is not totally dehalogenated to biphenyl.

It would be desirable therefore to be able to stimulate extensive and rapid microbial dechlorination of aged PCBs in freshwater, estuarine and marine sediments under anaerobic conditions.

SUMMARY OF THE INVENTION

The present invention is based on the discovery that the dehalogenation of brominated and iodinated biphenyls requires a shorter acclimation time with particular microbial populations than does the dehalogenation of PCBs. Furthermore, the dehalogenation activity stimulated by these substances often exhibits cross-reactivity with PCBs. Thus the stimulation of extensive and rapid microbial dechlorination of polychlorinated biphenyls including PCBs comprised mainly of hexa- and heptachlorobiphenyls, such as Aroclor 1260, can be effected when such brominated or iodinated biphenyls are added to sediments contaminated with PCBs. Accordingly, sediments contaminated with PCBs having an average of about 3 to 9 chlorine atoms per biphenyl nucleus can be reduced by an average of up to one or more chlorines per biphenyl nucleus which includes the elimination or reduction of a significant amount of the more highly chlorinated biphenyls. A convenient indication of when a substantial reduction or elimination of the more highly chlorinated PCBs has occurred at a particular test site is when there is shown a decrease of at least 20% of the more highly chlorinated PCBs and a corresponding increase in the lower chlorinated PCBs in a random test sample removed from the site after the bioremediation period.

The microbial dechlorination of PCBs that is stimulated by the process of the invention does not reduce the total number of PCB molecules, but it does decrease the toxicity, carcinogenicity, and bioaccumulation of the PCBs and increases their susceptibility to biodegradation by aerobic bacteria and metabolism by higher organisms. Therefore, the microbial dechlorination of PCBs stimulated in sediments by the addition of brominated or iodinated biphenyls significantly reduces the health risk of the sediment PCBs.

STATEMENT OF THE INVENTION

There is provided by the present invention, a method for bioremediating sediment from a site contaminated with PCBs under anaerobic conditions where the PCBs have an average of at least 3 chemically combined chlorine atoms which comprises, (1) selecting a random sediment sample from the site contaminated with PCBs having an average of from 3 to 9 chlorine atoms per biphenyl nucleus, (2) adding to the sediment sample an amount of substantially chlorine-free biphenyl substituted with from one to six halogen radicals selected from the class consisting of bromine, iodine and a mixture thereof, which is effective for stimulating the growth of indigenous microorganisms that can dehalogenate halogenated biphenyls and which may be present in the sediment and exhibit cross reactivity with PCBs, (3) allowing the mixture of (2) to incubate anaerobically at a temperature of 20° C. to 30° C. for a period of at least 20 days and determining whether there is a decrease of at least 20% in the more highly chlorinated PCBs, (4) after finding that significant dechlorination has occurred in the contaminated sample of steps (1)-(3), selecting a bioremediation zone within the contaminated site area and enclosing the selected bioremediation zone sufficiently to permit the controlled introduction of substantially chlorine-free halogenated biphenyl at a scale proportionate to the amount used in (2), and (5) introducing an effective amount of the substantially chlorine-free halogenated biphenyl of (2) into the enclosed bioremediation zone and allowing the mixture to incubate at a temperature of about 8° C. to about 30° C. under anaerobic conditions until there is obtained at least a 20% decrease of the more highly chlorinated PCBs in a sediment sample obtained from the enclosed bioremediation zone as compared to the sediment sample of (1).

Brominated biphenyls useful in bioremediating PCBs under anaerobic conditions, are for example the following compounds, where "BB" is brominated biphenyl and reference is made to the previously shown biphenyl nucleus:

| | |
|---|---|
| 2-BB | 2,4,5-BB |
| 3-BB | 3,4,5-BB |
| 4-BB | 2,4,6-BB |
| 2,4-BB | 2,5,2'-BB |
| 2,5-BB | 2,5,3'-BB |
| 2,6-BB | 2,5,4'-BB |
| 2,2'-BB | |
| 4,4'-BB | |

Iodinated biphenyl or "IB" compounds which have been found useful in the practice of the method of the invention, are for example, 2-IB, 4-IB and 4,4'-IB.

PCB contaminants commonly found in the environment include commercial mixtures of PCBs such as Aroclors 1016, 1242, 1248, 1254, 1260, 1262 and 1268. These Aroclors can be characterized as follows:

| | | Average Number of Chemically Combined Chlorine Atoms |
|---|---|---|
| Aroclor | 1016 | 3 |
| " | 1242 | 3-4 |
| " | 1248 | 4-5 |
| " | 1254 | 5-6 |
| " | 1260 | 6-7 |
| " | 1262 | 7 |
| " | 1268 | 8-9 |

A convenient method for determining the composition of PCBs in a random sample selected from a contaminated site is to use a gas chromatograph equipped with a high resolution capillary column and an electron capture detector to obtain a quantitative congener specific analysis of the PCBs calibrated against a mixture of Aroclors 1221, 1242, 1254 and 1260 of known composition.

Nutrients also can be used in combination with the chlorine-free halogenated biphenyl. Nutrients which may be effective depending on the site, are ammonium or alkali metal salts of organic acids adjusted to pH 6 to 7, such as sodium salts of malic, pyruvic, fumaric, succinic, benzoic, formic, and lactic acids; glucose; amino acids; and salts of fatty acids, including acetate, proprionate, butyrate, and hexanoate.

An effective amount of the chlorine-free halogenated biphenyl, such as the brominated or iodinated biphenyl, is 0.1 to 11 millimoles per Kg of dry contaminated sediment and preferably 2.5 to 6 millimoles/Kg. One method of introducing the chlorine-free halogenated biphenyl to the sediment to ensure its uniform dispersion is by addition of the chlorine-free halogenated biphenyl as a solution in an organic solvent that is both biodegradable and miscible with water. For example, a concentrated stock solution (70 mM) in acetone can be used. An effective concentration of nutrient which can be used for bioremediation of the contaminated sediment is 0.1 to 20 mMoles/liter of slurry.

The initial selection of a random sample from the contaminated site is to determine the feasibility of applying the method of the present invention to bioremediate the identified contaminated area. Although the initial screening procedure can generally be conducted at ambient temperatures, in some instances depending upon such factors as the nature of the sediment, its location, the extent of PCB contamination, the particular PCBs present and their concentration, and the indigenous microbial populations present, temperatures in the range of 20° C. to 30° C. can be used. Agitation of the sediment during treatment, such as by stirring, can also be necessary in particular instances.

If the initial screening procedure has indicated that bioremediation of the site is feasible, direct treatment of the contaminated site can be undertaken.

After an initial feasibility study showing significant dechlorination and a reduction in chlorine substitution as compared to the substitution in the initial sample, an appropriate section of the contaminated site can be enclosed or "walled in" to allow for follow-up bioremediation. In some instances, a structure such as a vertical caisson may be appropriate.

Also included in the present invention are PCB-contaminated soil or landfill sites which can be submerged in water followed by the addition of a microbial inoculum prepared from a PCB-contaminated sediment, nutrient and substantially chlorine-free halogenated biphenyl. Some sediments may also require the addition of a microbial inoculum derived from a different PCB-contaminated sediment.

Figure 1:
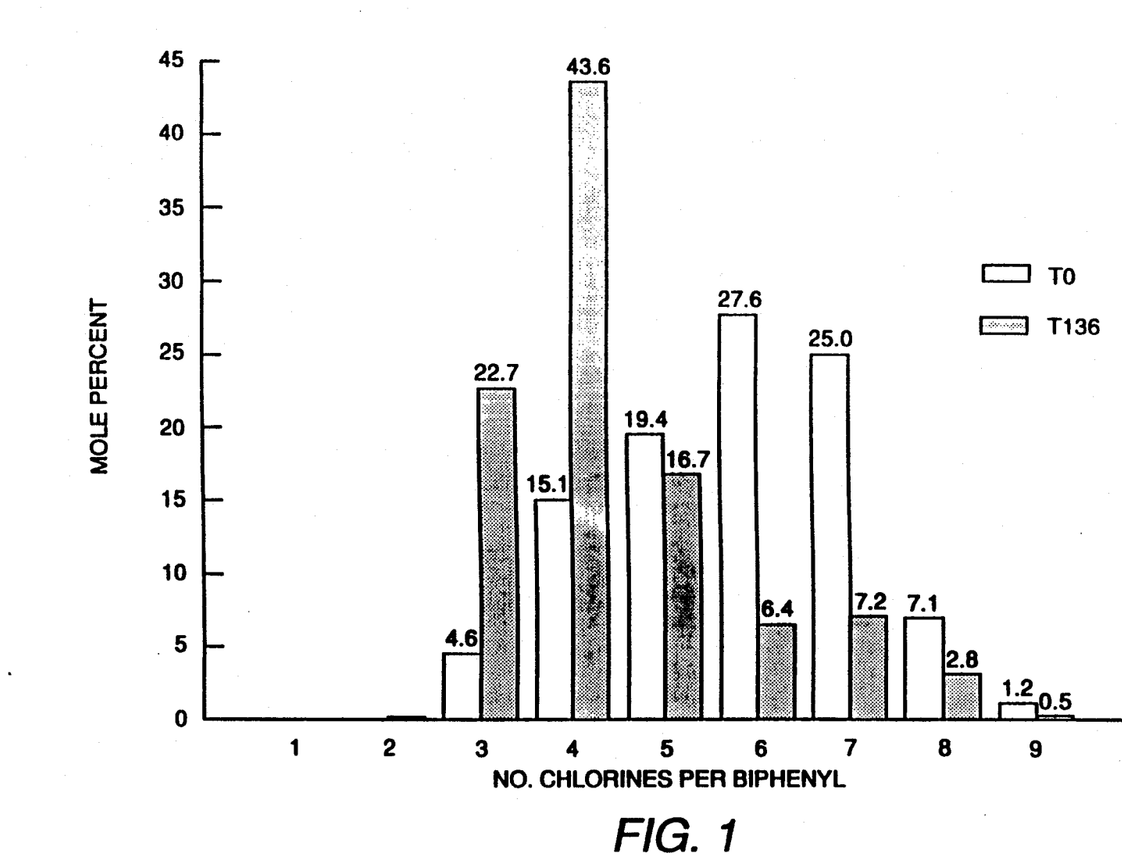
FIG. 1 shows the distribution of PCBs by chlorine number in a sample at time zero and 136 days after treatment.

Reference is made to the drawings which shows in FIG. 1 the distribution of PCBs by chlorine number in a sample from a contaminated site having a significant molar proportion of PCBs with 6 and 7 chlorines per biphenyl nucleus at time zero (T0). A significant shift had occurred in the average composition of PCBs 136 days after the addition of 2,6-BB and the sodium salt of malic acid which indicated that bioremediation of the contaminated sediment in accordance with the practice of the method of the invention would be feasible.

Figure 2A:
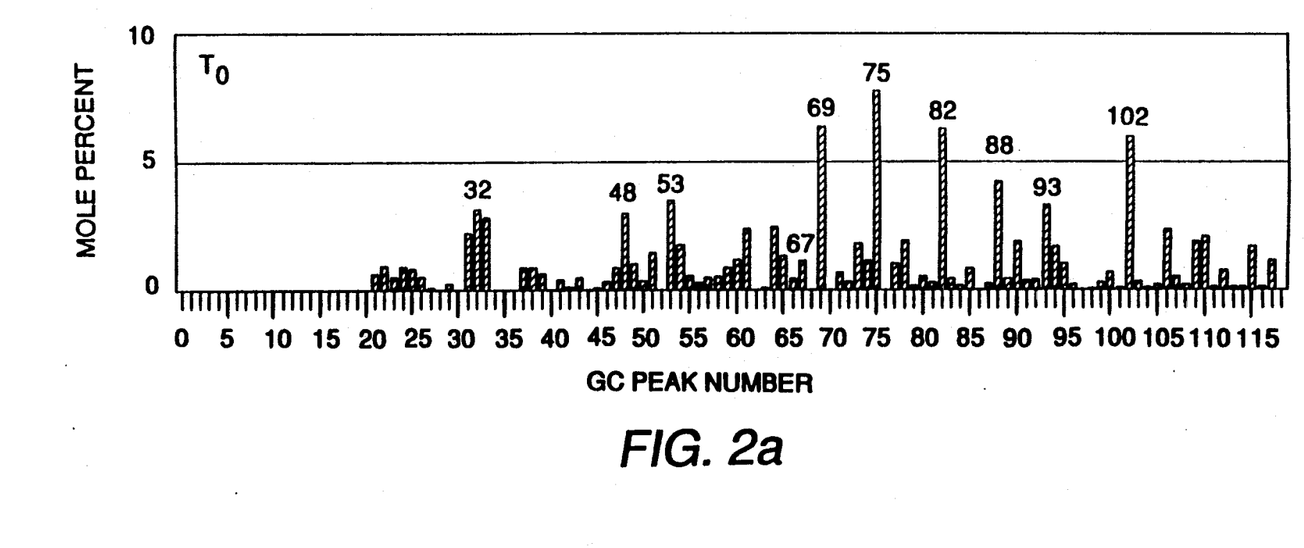
FIGS. 2a-c show the analysis of a sample containing PCBs at time zero and 136 days after treatment, and the difference between the two results.
Figure 2B:
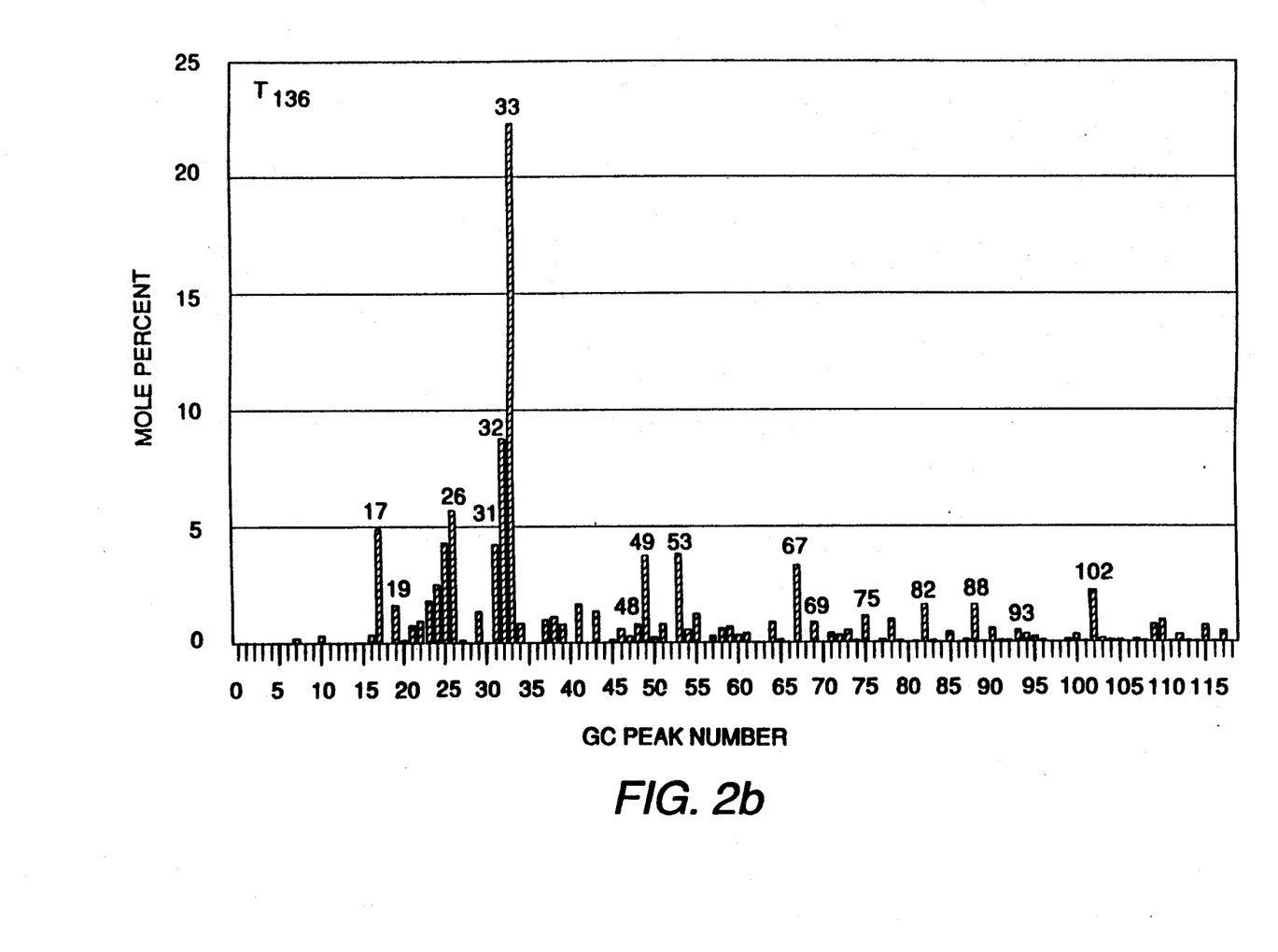
Figure 2C:
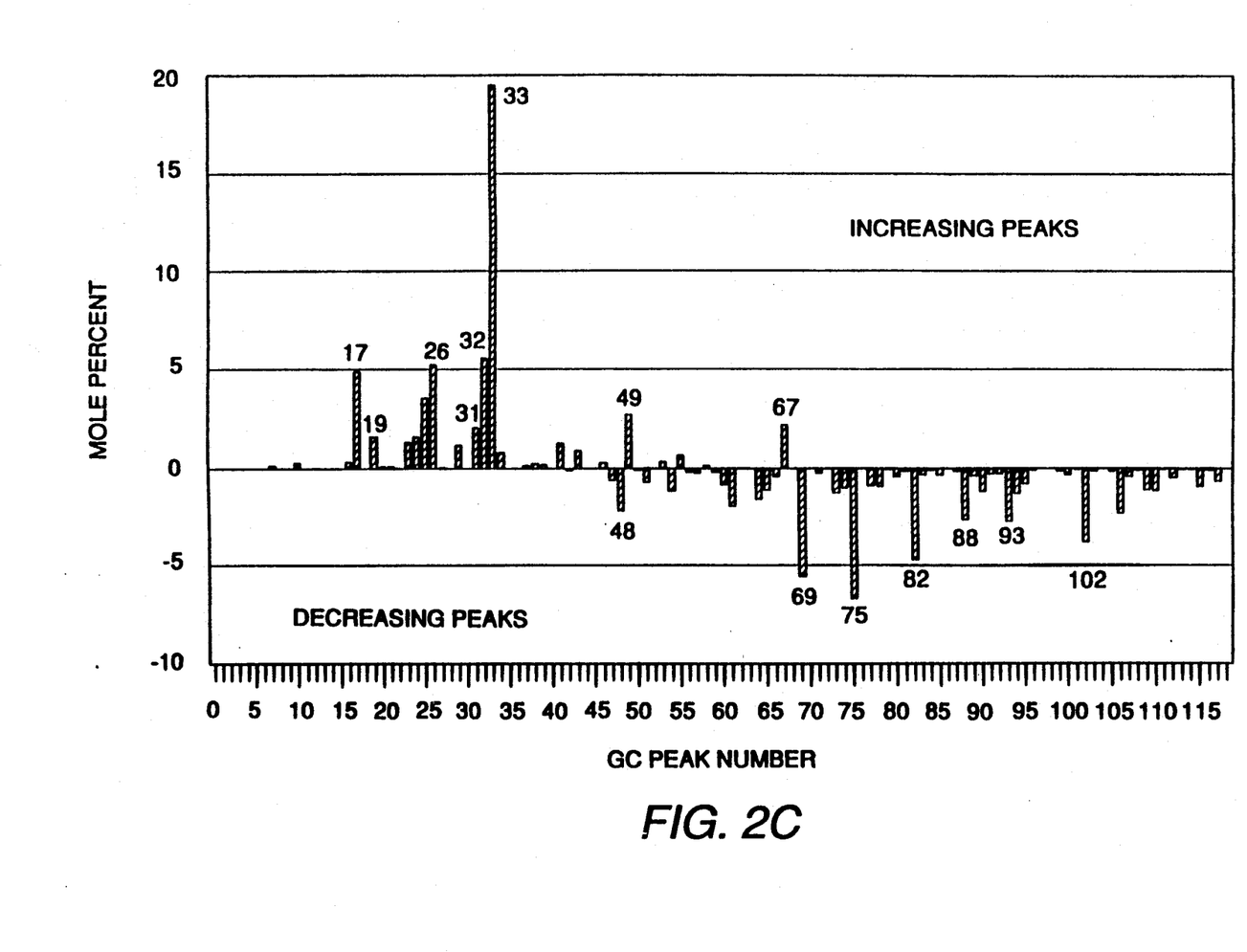

FIGS. 2a–c show a congener-specific analysis of the use of 2,6-BB on aged Aroclor 1260 shown in FIG. 1. FIG. 2a shows the initial PCB mixture where more than 80 mole percent of the PCBs have 5 or more chlorines at time zero. FIG. 2b shows a dramatic shift 136 days after the addition of 2,6-BB and malate. FIG. 2c shows the absolute increase or decrease of each peak.

Figure 3:
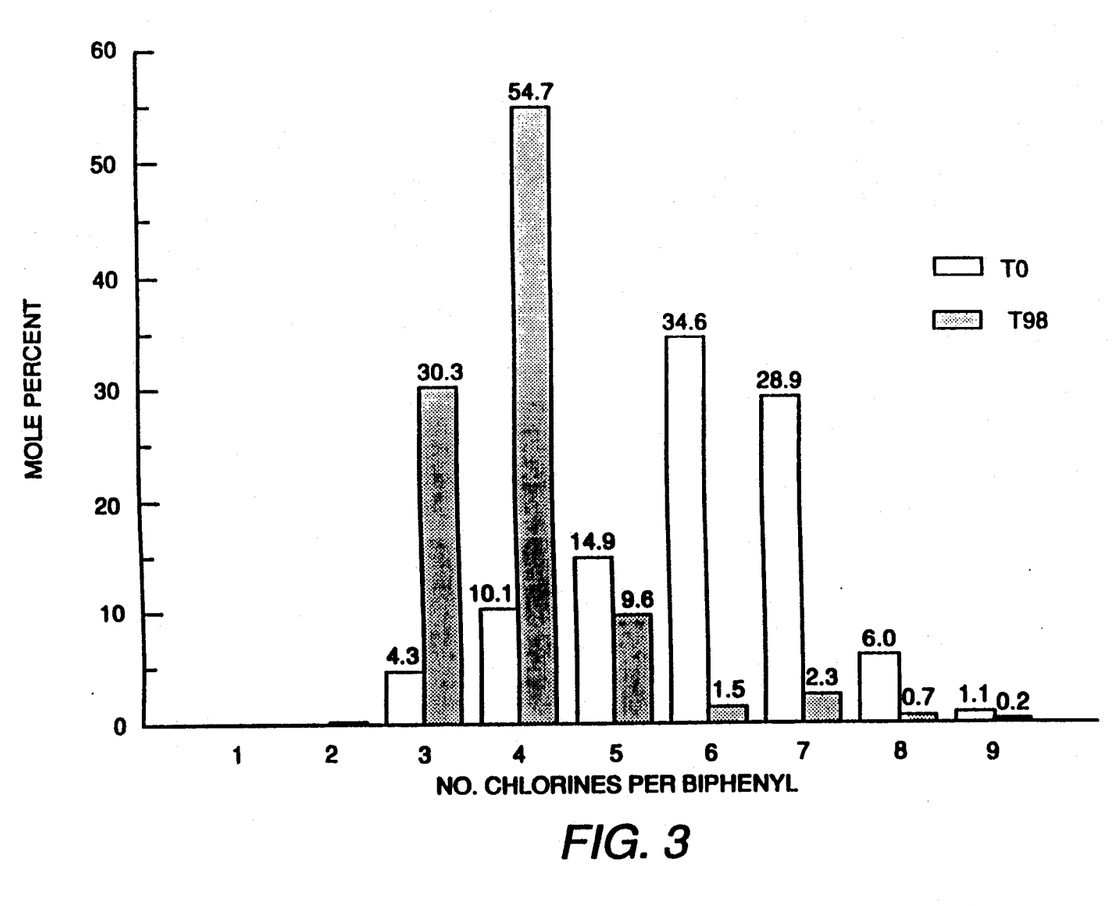
FIG. 3 shows the distribution of PCBs by chlorine number in another sample at time zero and 98 days after treatment.

FIG. 3 shows the microbial dechlorination of Aroclor 1260 in a sediment from a different location 98 days after the addition of a microbial inoculum, 2,6-BB, and malate.

In order that those skilled in the art will be better able to practice the present invention, the following examples are given by way of illustration and not by way of limitation. All parts are by weight unless otherwise indicated.

EXAMPLE 1

Sediment was collected randomly from a PCB contaminated site where the major PCB contaminant was Aroclor 1260, a mixture of PCBs comprised of mainly hexa- and heptachlorobiphenyls and therefore a difficult substrate for microbial attack. The sediment was slurried anaerobically with double distilled water to prepare a sample having a volume of about 30 mL with 9% by weight solids. The sodium salt of L-malic acid, (pH 7.0), and 2,6-dibromobiphenyl (2,6-BB) were added to the sediment at final concentrations of 10 mM and 350 $\mu$M respectively. The mixture was then incubated anaerobically at room temperature (24° C. to 25° C.). After a delay of about a week, the 2,6-BB was rapidly dehalogenated in a stepwise fashion to 2-bromobiphenyl (2-BB) and then biphenyl as determined by comparison with authentic standards by gas chromatography - mass spectrometry. By fourteen days half of the 2,6-BB had been dehalogenated to 2-BB. The 2-BB persisted until 21 days and then was itself rapidly dehalogenated. By 35 days, 99% of the 2,6-BB had been dehalogenated to biphenyl (97%), or 2-BB (2%), and only 1% remained unchanged.

While the 2,6-BB was dehalogenating, dechlorination of the Aroclor 1260 was first observed at 14 days and continued for at least 4 months. Aliquots of the slurries were sampled weekly and extracted with vigorous shaking for 24 hours with anhydrous ether (5 volumes) and elemental mercury ($\frac{1}{4}$ volume, to remove sulfur). Samples were analyzed by capillary gas chromatography with an electron capture detector and a DB-1 capillary column (J & W Scientific; 30 m by 0.25-mm (i.d.) by 0.25 $\mu$m) as described by J. F. Brown, Jr., et al (1987) Environ, Toxicol. Chem. 6:579–593. A quantitative congener specific analysis of the PCBs was obtained by calibrating against Aroclors 1242, 1254, and 1260 of known PCB congener composition.

As previously indicated, FIGS. 2a–c show a bar graph representation of the molar distribution of PCB congeners in the sediment at the beginning of the experiment and after 136 days. FIG. 2c shows the absolute increase or decrease of each peak. The fact that all of the peaks at the right end of the graph decreased indicates that all of the PCBs with 6 or more chlorines were dechlorinated. The pentachlorobiphenyls (peaks 44 through 63) were also dechlorinated but the overall change was less apparent because they were being constantly replaced by dechlorination of the hexa- and heptachlorobiphenyls.

FIG. 1 shows the molar distribution of di- through nonachlorobiphenyls in the sediment before and after the addition of 2,6-BB. Again, the decrease in PCBs with six or more chlorines and the shift to PCBs having only 3 or 4 chlorines is obvious. Overall, the hexa- through nonachlorobiphenyls (initially 61% of the total PCB) were decreased by 72%. At 136 days 83% of the PCB was tri- to pentachlorobiphenyl.

EXAMPLE 2

A microbial inoculum was prepared from a slurry of sediment collected from a particular PCB contaminated site. The microbial inoculum was added to a pasteurized sediment slurry that had been prepared from a pristine marsh sediment and spiked with Aroclor 1260 and 2,6-BB. The following is a detailed description:

Two volumes of wet sediment from a particular PCB contaminated site were slurried anaerobically with three volumes of double-distilled water. An inoculum containing the indigenous anaerobic microorganisms was prepared from this slurry by two consecutive gravity filtrations of the sediment slurry through several layers of glass wool. A second sediment slurry was prepared from a pristine marsh sediment by anaerobically mixing two volumes of wet sediment with 3 volumes of double distilled water. The pristine marsh sediment slurry was then pasteurized twice by heating to 80° C. for 10 minutes with a 24 hour interval at 24° C. between heatings. The first pasteurization was to kill the vegetative microorganisms in the marsh sediment slurry and to activate spores. The second pasteurization was to kill spore-forming microorganisms that had germinated as a result of the first pasteurization. The twice pasteurized marsh slurry was allowed to settle and the supernatant was removed and replaced with the microbial inoculum prepared from the PCB contaminated sediment slurry. Aroclor 1260, 2,6-BB and the sodium salt of L-malic acid, pH 7.0, were then added to the resulting inoculated sediment to give final concentrations on a weight/volume basis of 10 ppm, 350 $\mu$M and 10 mM, respectively.

The above mixture was set up in duplicate along with controls which were again pasteurized twice to kill the microbial inoculum. Aliquots of the slurries were extracted and analyzed as described in Example 1.

The pasteurized controls showed no change throughout the experiment. At 22 days, at room temperature (24°-25° C.), 2,6-BB was dehalogenated to 2-BB, and at 28 days GC-mass spectrometer analysis indicated that much of the 2,6-BB had been completely dehalogenated to biphenyl. At the onset of debromination of 2,6-BB, dechlorination of Aroclor 1260 was also noted. The Aroclor 1260 was dechlorinated by the loss of meta and para chlorines in a characteristic pattern that is known as Pattern N.

It was found that after 98 days, a significant change in the initial composition of Aroclor 1260 had occurred. As shown in FIG. 3, Aroclor 1260 consists of a mixture of congeners having an average of 35 mol % of hexachlorobiphenyl, about 29 mol % of heptachlorobiphenyl, about 15 mol % of pentachlorobiphenyl and about 10 mol % of tetrachlorobiphenyl and 6 mol % octachlorobiphenyl. However, 98 days after the addition of the microbial inoculum, 2,6-BB, and L-malate, the PCBs consisted of about 10 mol % pentachlorobiphenyl, 55 mol % of tetrachlorobiphenyl, and 30 mol % of trichlorobiphenyl. This established that the microbial inoculum derived from the contaminated sediment and added in combination with 2,6-BB was capable of extensive and rapid dechlorination of Aroclor 1260 in a sediment derived from a different location. No such dechlorination occurred if the microbial inoculum was added alone without a bromo or iodobiphenyl substrate.

EXAMPLE 3

The procedure of Example 1 was substantially repeated except that in place of 2,6-BB there was utilized iodinated biphenyl, such as 2-IB, 4-IB, and 4,4'-IB. The iodinated biphenyls are found to stimulate rapid and extensive dechlorination of the endogenous Aroclor 1260. The results are essentially the same as that obtained with the 2,6-BB of Example 1.

EXAMPLE 4

The procedure of Example 1 was substantially repeated, except that in place of 2,6-BB there was utilized another brominated biphenyl such as 2-BB, 3-BB, 4-BB, 2,2'-BB, 2,4-BB, 2,5-BB, 4,4'-BB, 2,4,5-BB, 2,4,6-BB, 2,5,2'-BB, 2,5,3'-BB, 2,5,4'-BB, or 3,4,5-BB. These brominated biphenyls were also found to stimulate extensive dechlorination of the Aroclor 1260 in the sediment. The results were similar to those obtained with the 2,6-BB of Example 1.

Although the above examples are directed to only a few of the very many variables with which the present method can be applied, it should be understood that the present invention is directed to the dechlorination of a much broader variety of PCBs with brominated biphenyls and iodinated biphenyls as set forth in the description preceding these examples.

What is claimed is:

1. A method for bioremediating sediment from a site contaminated with PCBs under anaerobic conditions where the PCBs have an average of at least 3 to 9 chemically combined chlorine atoms which comprises,
   (1) selecting a random sediment sample from the site contaminated with PCBs having an average of from 3 to 9 chlorine atoms per biphenyl nucleus,
   (2) adding to the sediment sample an amount of a substantially chlorine-free biphenyl substituted with from one to six halogen radicals selected from the class consisting of bromine, iodine and a mixture thereof, which is effective for stimulating the growth of indigenous microorganisms which are capable of dechlorinating PCBs, and which may be present in the sediment,
   (3) allowing the mixture of (2) to incubate anaerobically at a temperature of 20° C. to 30° C. for a period of at least 20 days to determine whether there is a decrease of at least 20% in the more higher chlorinated PCBs,
   (4) after finding a significant decrease in the more highly chlorinated PCBs in the contaminated sediment sample of (1)–(3), selecting a bioremediation zone within the contaminated site area and enclosing the selected zone sufficiently to permit the controlled introduction of substantially chlorine-free halogenated biphenyl at a scale proportionate to the amount used in (2), and
   (5) introducing an effective amount of the substantially chlorine-free halogenated biphenyl of (2) into the enclosed bioremediation zone and allowing the mixture to incubate at a temperature about 8° C. to about 30° C. under anaerobic conditions until there is obtained at least a 20% decrease of the more highly chlorinated PCBs in a sediment sample obtained from the enclosed bioremediation zone as compared to the sediment sample of step (1).

2. A method in accordance with claim 1, where nutrient is used in combination with the substantially chlorine-free halogentated biphenyl.

3. A method in accordance with claim 2, which employs malate as a nutrient.

4. A method in accordance with claim 2, which employs malate as a nutrient in combination with 2,6-dibromodiphenyl.

5. A method in accordance with claim 2, which employs malate as a nutrient in combination with a substantially chlorine-free halogenated biphenyl selected from the class consisting of 2-BB, 3-BB,4-BB, 2,2'-BB, 4,4'-BB, 2,4-BB, 2,5-BB, 2,4,5-BB, 3,4,5-BB, 2,4,6-BB, 2,5,2'-BB, 2,5,3'-BB, and 2,5,4'-BB.

6. A method in accordance with claim 1, where the substantially chlorine-free halogneated biphenyl is 2,6-dibromobiphenyl.

7. A method in accordance with claim 1, where the substantially chlorine-free halogneated biphenyl is selected from the class consisting of 2-iodobiphenyl, 4-iodobiphenyl and 4,4'-iodobiphenyl.

8. A method in accordance with claim 7, which employs malate as a nutrient in combination with the substantially chlorine-free halogenated biphenyl.

9. A method in accordance with claim 1 where the selected bioremediation area in the contaminated site is enclosed in a caisson.

10. A method in accordance with claim 1, where the substantially chlorine-free halogenated biphenyl is a member selected from the class consisting of 2-BB, 3-BB, 4-BB, 2,2'-BB, 4,4'-BB, 2,4-BB, 2,5-BB, 2,4,5-BB, 3,4,5-BB, 2,4,6-BB, 2,5,2'-BB, 2,5,3+-BB, and 2,5,4'-BB.

11. A method in accordance with claim 1 where the contaminant is a mixture PCBs selected from the class consisting of Aroclors 1016, 1242, 1248, 1254, 1260, 1262, and 1268.

12. A method in accordance with claim 1, whereby a microbial inoculum prepared from a PCB contaminated sediment is combined with a substantially chlorine-free halogenated biphenyl.

13. A method in accordance with claim 12, whereby nutrient is added along with the substantially chlorine-free halogenated bipehnyl.

14. A method in accordance with claim 1, whereby the site to be treated is soil or landfill and the treatment includes submerging the site under water prior to step 1, and adding a microbial inoculum prepared from a PCB-contaminated sediment, a substantially chlorine-free halogenated biphenyl, and nutrient.

* * * * *